United States Patent
Meksavan et al.

(10) Patent No.: US 6,547,146 B1
(45) Date of Patent: Apr. 15, 2003

(54) METHOD, SYSTEM AND APPARATUS FOR PROCESSING BARCODE DATA

(75) Inventors: Boonphet Meksavan, St. Charles, IL (US); James C. Graves, Rolling Meadows, IL (US); Roman J. Berka, Algonquin, IL (US)

(73) Assignee: iPilot, Inc., Schaumburg, IL (US)

( * ) Notice: Subject to any disclaimer, the term of this patent is extended or adjusted under 35 U.S.C. 154(b) by 0 days.

(21) Appl. No.: 09/565,058

(22) Filed: May 3, 2000

(51) Int. Cl.[7] .................................................. G06K 7/10
(52) U.S. Cl. ............................. 235/462.46; 235/462.49; 235/472.03
(58) Field of Search ....................... 235/462.01, 462.07, 235/462.45, 462.46, 462.49, 472.01, 472.02, 472.03, 462.24; 345/175

(56) References Cited

U.S. PATENT DOCUMENTS

| | | | | |
|---|---|---|---|---|
| 4,411,016 A | * | 10/1983 | Wakeland | 235/462.17 X |
| 4,465,926 A | * | 8/1984 | Apitz et al. | 235/462.49 |
| 4,471,218 A | * | 9/1984 | Culp | 235/462.46 |
| 4,792,812 A | * | 12/1988 | Sussman et al. | 235/472.01 X |
| 4,841,132 A | * | 6/1989 | Kajitani et al. | 235/462.46 |
| 5,051,567 A | * | 9/1991 | Tedesco | 235/462.17 |
| 5,099,109 A | * | 3/1992 | Ishikawa et al. | 235/462.49 X |
| 5,210,398 A | * | 5/1993 | Metlitsky | 235/462.24 |
| 5,362,953 A | * | 11/1994 | McKenna et al. | 235/462.49 |
| 5,481,098 A | * | 1/1996 | Davis et al. | 235/462.07 |
| 5,656,805 A | * | 8/1997 | Plesko | 235/472.063 |
| 5,939,702 A | * | 8/1999 | Knighton et al. | 235/472.03 |
| 6,112,992 A | * | 9/2000 | Agabra et al. | 235/462.25 |
| 6,119,944 A | * | 9/2000 | Mulla et al. | 235/472.03 |
| 6,273,336 B1 | * | 8/2001 | Rudeen et al. | 235/462.24 |
| 2001/0028344 A1 | * | 10/2001 | Iwamoto et al. | 345/175 |

FOREIGN PATENT DOCUMENTS

| | | | |
|---|---|---|---|
| JP | 63-49892 A | * | 3/1988 |
| JP | 4-358466 A | * | 12/1992 |
| JP | 6-3116 A | * | 1/1994 |

* cited by examiner

*Primary Examiner*—Michael G. Lee
*Assistant Examiner*—Jared J. Fureman
(74) *Attorney, Agent, or Firm*—Howrey, Simon, Arnold & White, LLP (57) ABSTRACT

A barcode scanning system and method, and hand-held contact scanner are provided. The contact scanner includes a photoemitter, a photodetector, a screen, abutted against the photodetector, for limiting the amount of light reaching the photodetector, a lens placed in front of the screen a memory for storing data related to transitions detected in the reflected beam; an infrared (IR) transceiver for transmitting the stored data to a host, a processor programmed to allow the scanner to read a barcode when the scanner is moved over the barcode at a lineal speed between one inch/second and five inches/second, a first manually-operated switch for activating the photoemitter in order to read the barcode; and a second manually-operated switch for causing the data stored in the memory to be transmitted by the IR transceiver.

24 Claims, 7 Drawing Sheets

METHOD, SYSTEM AND APPARATUS FOR PROCESSING BARCODE DATA

TECHNICAL FIELD OF THE INVENTION

The invention relates generally to optical scanners, and in particular to a low-cost handheld optical scanner for reading and transmitting barcode data.

BACKGROUND OF THE INVENTION

Various optical scanning systems have been developed for reading indicia such as barcode symbols appearing on labels or on the surfaces of articles. Barcode symbology is well established, with several industry standards for encoding data. Generally, a barcode symbol is a coded pattern of indicia comprised of a series of black bars of various widths spaced apart from one another so as to bound white spaces of various widths. The bars and spaces have different light reflecting characteristics. Optical scanning systems transform the barcode graphic indicia to electric signals, which are then decoded into alphanumeric characters that are descriptive of an article or some characteristic thereof. A number of different scanning systems have been developed to decode barcode symbols. Typically, these systems include a laser scanning device or charge coupled device (CCD) scanner for reading barcodes.

A disadvantage of laser and CCD scanners is that they are relatively expensive. This limits their widespread use in newly developed consumer applications relying on barcode symbols. The Internet access system described in U.S. Pat. No. 5,978,773, assigned to NeoMedia Technologies, Inc., is an example of a recently developed consumer application for optical scanners and barcode symbols. In this system, consumers are able to locate resources on the Internet by scanning barcode symbols. Such applications can benefit from low-cost optical scanners and systems that are affordable to average consumers.

BRIEF DESCRIPTION OF THE DRAWINGS

The invention is pointed out with particularity in the appended claims. The drawings and detailed description which follow are merely illustrative of the invention, rather than limiting. The scope of the invention is defined by the appended claims and equivalents thereof. Accordingly:

DETAILED DESCRIPTION OF THE PRESENTLY PREFERRED EMBODIMENTS

Figure 1:
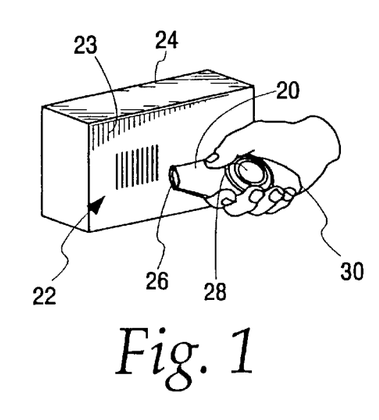
FIG. 1 illustrates one embodiment of an optical scanner for reading a barcode symbol in accordance with the present invention.

Turning now to the drawings, and in particular to FIG. 1, there is shown a handheld optical scanner 20 for reading a barcode symbol 22 appearing on a scanning surface 23. The scanning surface 23 can be included on an article 24, such as a box, sheet of paper, or included in a publication such as a catalog or magazine displaying advertisements that include a barcode symbol.

The optical scanner 20 includes a scanning head 26 for contacting the scanning surface 23 and reading the barcode symbol 22. The scanner 20 also includes an optical transceiver port 30 for transferring scanned barcode data to other devices by way of a wireless communication path. Barcode data is information encoded by a barcode symbol.

The optical scanner 20 includes a manual operator 28 permitting a user to set the operational mode of the scanner 20. The manual operator 28 can include one or more momentary contact pushbutton switches, which allow a user to control operations of the scanner 20. The manual operator 28 can be used to turn on scanner 20, as well as switch modes of operation between a scan mode and a transmit mode. The operational modes of the scanner 20 are described in further detail below in connection with FIGS. 5–6.

The barcode symbol 22 is read by placing the scanner 20 so that the scanning head 26 is in contact with or in close proximity to the scanning surface 23. The scanning head 26 is then manually swiped over the barcode symbol 22. The scanner 20 can be configured to accurately read barcode symbols when the scanning head 26 is moved over a symbol at a lineal speed between one inch per second and five inches per second.

Different barcode symbologies can be read by the scanner 20. For example, the scanner 20 can read barcode symbols defined according to industry standards, such as the universal product code (UPC), 128, 3 of 9, and the like.

An advantage of the optical scanner 20 is that it is inexpensive to manufacture and provides consumers a low-cost means for scanning barcode data and transferring it to a host device.

Figure 2:
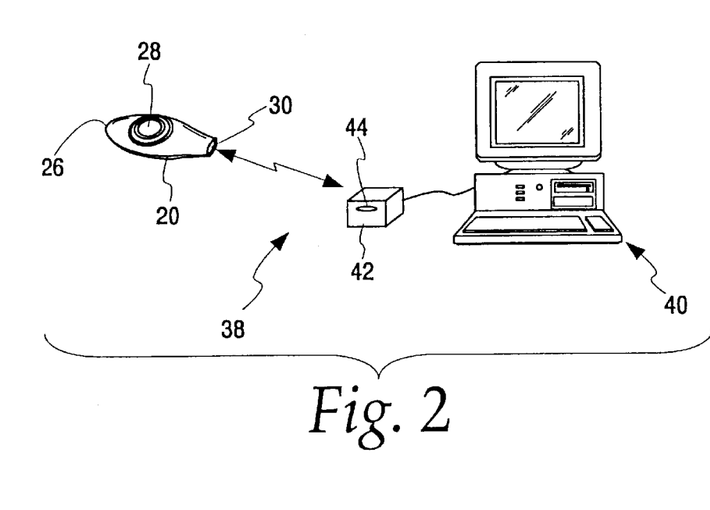
FIG. 2 illustrates one embodiment of a system, in accordance with the present invention, for transmitting scanned barcode data to a host.

FIG. 2 illustrates a system 38 for transferring scanned barcode data from the optical scanner 20 to a host computer 40. The data can be transferred from the optical transceiver port 30 of the scanner 20 to an optical port 42 which is attached to the host computer 40. The optical port 42 can include a photosensitive receiver 44 for receiving and converting optical signals from the scanner 20 into electrical signals for use by the host 40.

The host computer 40 can be a standard workstation or personal computer (PC) running a conventional operating system, such as Unix, Linux, or Windows 98 or NT, or the like. The host 40 can alternatively be implemented using other devices, such as a pager or personal digital assistant (PDA) such as the Palm Pilot available from Palm, Inc. The optical port 42 can be a commercially-available infrared (IR) port for receiving infrared signals and providing them to the host 40 as electrical signals. An exemplar of the optical port 42 is the IR-220 serial dongle available from Actisys, Inc., which attaches to a conventional PC serial port and converts IR signals to standard RS-232 signals.

Although the present invention can be practiced using a radio frequency (RF) wireless link between the scanner 20 and the host 40, an IR communication path is preferably used. The IrDA standard can be employed to transfer data over the air between the optical port 30 and the host optical port 42.

Each barcode transmitted by the scanner 20 is encapsulated into a data packet and then transmitted to the host 40.

Each packet is defined by a barcode transmission format, which includes the following fields:

| | |
|---|---|
| Leader = | Three bytes of 0xFF |
| Cyclic Redundancy Code (CRC) = | Two bytes (16-bit unsigned integer) |
| Type = | One byte (ACSII) |
| Length = | One byte (unsigned byte) |
| Barcode Data = | 255 bytes |

The type field is used to identify different types of barcode symbologies representing the scanned barcode data, such as UPC-A, UPC-E, EAN, 128, and 3 of 9.

The CRC can be computed based on the type, length and barcode data fields. As an alternative to a CRC, a checksum can be used instead and computed over the same fields.

For each barcode data packet received, the host 40 generates an acknowledgment (ACK) response that is transmitted back to the scanner 20. The packet format for the ACK response is:

| | |
|---|---|
| Leader = | Three bytes of 0xFF |
| ACK = | One byte (ASCII character) |
| | "N": Barcode not received correctly |
| | "D": Received correctly and delete barcode stored at scanner |
| | "S": Received correctly and save barcode stored at scanner |

A software program on the host 40 can permit a user to configure the ACK as including either the "D" indication or the "S" indication for successfully transmitted barcodes.

The transmit function of the scanner 20 is described in further detail below in connection with FIG. 6.

Figure 3:
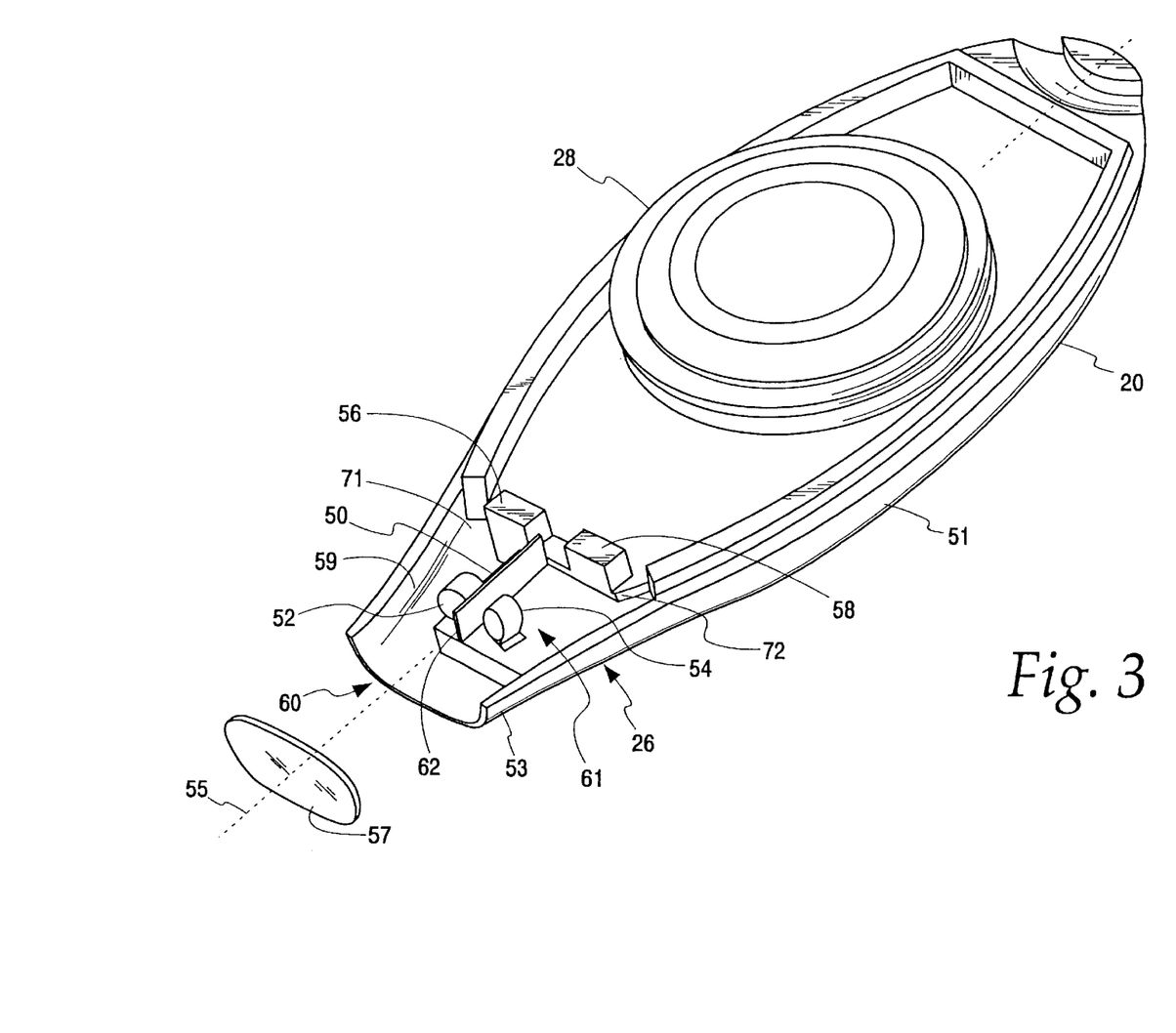
FIG. 3 is a perspective cut-away, partial exploded view of the handheld scanner shown in FIGS. 1–2.

FIG. 3 is a perspective partial cut-away diagram of the optical scanner 20. The scanner 20 includes a housing 51 forming an elongated compartment 62 having a top (cut-away not shown), a bottom 53, and an open end 60 at the scanning head 26 and of the scanner 20.

A transparent window 57 can be fitted over the open end 60 to enclose the compartment 62. A photoemitter 56, such as a commercially-available IR light emitting diode (LED), and a photodetector 58, such as a commercially-available phototransistor, are disposed at one end of the enclosed elongated compartment 62 so that their photosensitive surfaces generally face the open end 60.

The photoemitter 56 can be an IR LED emitting a light beam at a median wavelength of 850 nm, while the photodetector 58 can be an NPN phototransistor that is sensitive to light at a wavelength at or near 880 nm.

A wall 50 is located within the compartment 62 and extends along the length of a compartment 62 substantially aligned with the axis 55 of the housing 51. The wall 50 extends from the bottom 53 to the top (not shown cut-away) of the housing 51 to divide the compartment 62 into a first subcompartment 59 and a second subcompartment 61. The wall can provide a light tight seal in the compartment 62, which limits the amount of extraneous light reaching the photosensitive area 72 of the photodetector 58. This improves the ability of the photodetector 58 to detect contrast transitions occurring as the scanner 20 in moved over a barcode symbol.

An illuminator lens 52 is positioned within the first subcompartment 59 for focusing the light beam emitted by the photoemitter 56 onto a scanning surface coming into contact with the transparent window 57. An imaging lens 54 is positioned within the second subcompartment 61 for focusing light reflected from the scanning surface onto the photodetector 58. Each of the lenses can be made from low cost polycarbonate (clear plastic). The lenses 54, 56 can be focused at the same point at or near the contact point of the window 57 with the scanning surface 23. In addition, the lenses 54, 56 can be placed in the compartment so that they are arranged symmetrically about the axis 55 of the housing 51.

The partial exploded view shows the transparent window 57 removed from the open end 60. The transparent window 57 can be a clear piece of plastic shaped to cover the open end 60 and contact a scanning surface when the scanner is in use. Alternatively, the window 57 can be made from a material having optical properties that filter undesirable light frequencies and a pass light at those frequencies at which the photoemitter 56 and photodetector 58 operate.

The wall 50 prevents extraneous light, e.g., light not reflected from a barcode symbol from reaching the photodetector 58. This improves the overall reliability with which the optical scanner 20 reads barcode symbols.

FIG. 3 illustrates an embodiment of the present invention where the photosensitive surfaces 71, 72 of the photoemitter 56 and photodetector 58 are not aligned with the optical axes of the illuminator and imaging lenses 52, 54. In an alternative embodiment, the axis of the photoemitter 56 can be aligned with the optical axis of the illuminator lens 52, while the photosensitive area of the photodetector 58 can be aligned so that it is substantially normal to the optical axis of the imaging lens 54.

As will be described in further detail in connection with FIG. 7 herein, a pin hole aperture (not shown in FIG. 3) can be placed in close proximity to the photosensitive area of the photodetector 58 to limit the amount of light reaching the photosensitive area 72.

Figure 4A:
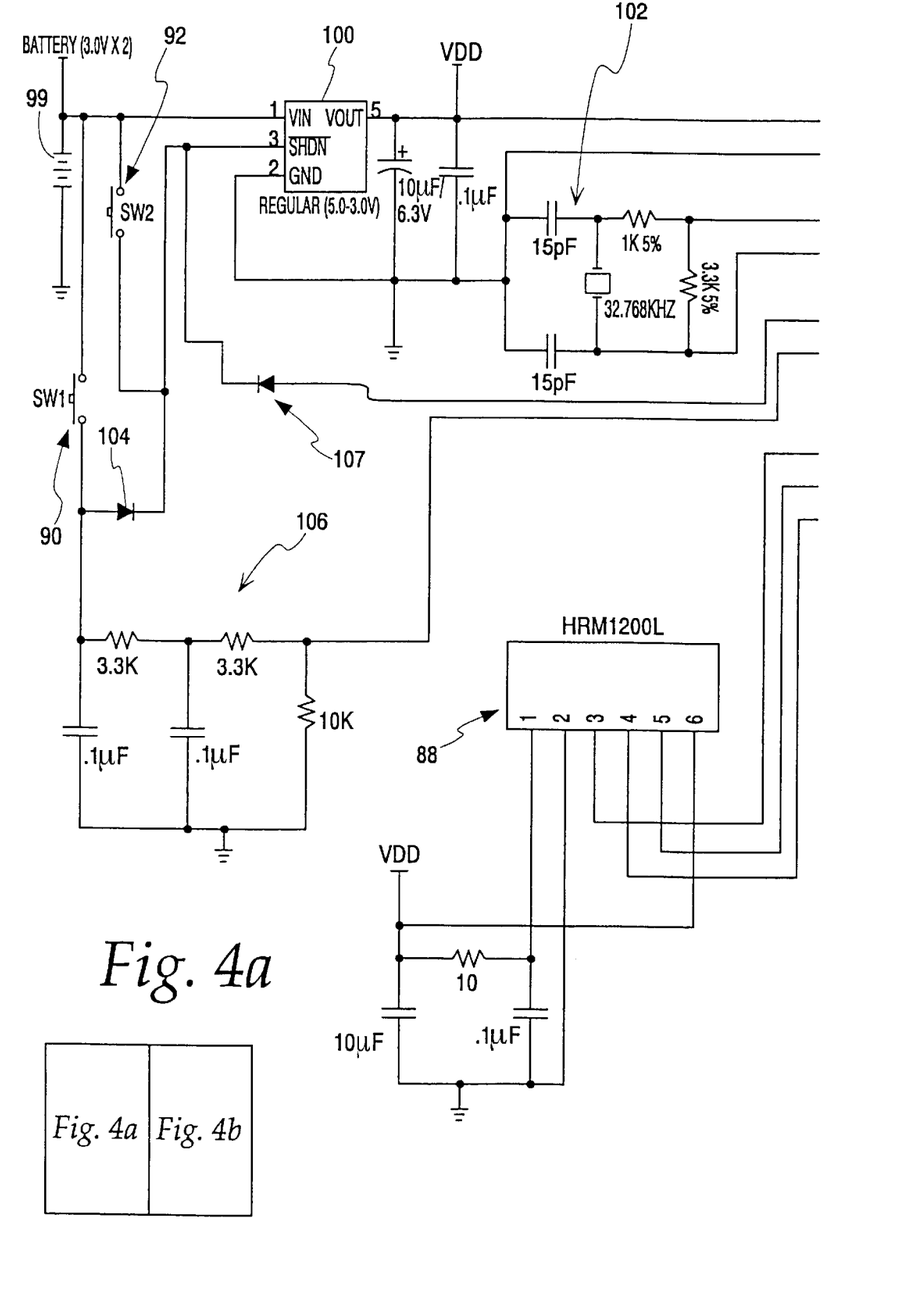
FIGS. 4a–b are a schematic diagram of an electronic circuit included in the handheld optical scanner of FIGS. 1–3.
Figure 4B:
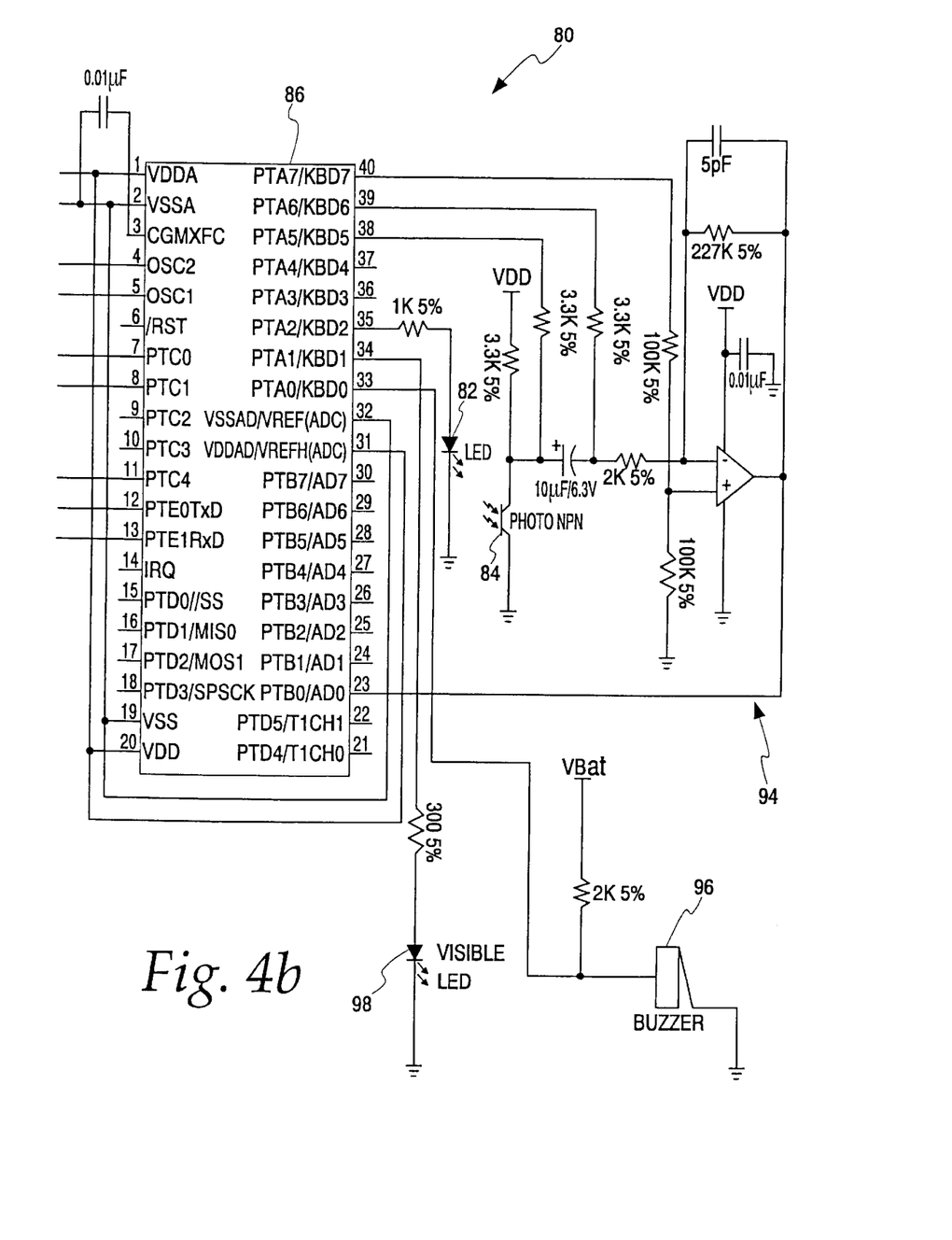

FIGS. 4a–b are a schematic diagram of an electronic circuit 80 included in the scanner 20. The circuit 80 includes a processor 86 operating in conjunction with and LED 82, a phototransistor 84, an optical transceiver port 88, and a pair of manually-operated switches 92. The LED 82 can be an IR LED acting as the photoemitter 56 for producing and IR optical beam. The phototransistor 84 acts as the photodetector 58, and is responsive to a wavelength of light emitted by the LED 82.

An amplifier circuit 94 amplifies signals from the phototransistor 84, and then provides the amplified signals as input to the processor 86.

A battery 99 provides power to the circuit 80. The output of the battery is regulated by a voltage regulator 100, which can be a commercially-available voltage regulator for providing 3.0–5.0 voltage output.

An oscillator circuit 102 provides a predetermined clock frequency to the processor 86.

A visible light LED 98 and a buzzer 96 provide visual and audio feedback to a user to indicate the operational status of the scanner 20. Both the LED 98 and buzzer 96 are controlled by the processor 86. The LED 98 can be attached to the housing 51 so that it is visible on the top side of the housing 51. The buzzer 96 can generate tones, under the direction of the processor 86, at different frequencies to indicate the various outcomes of scanner operations. For example, the processor 86 can be programmed to generate different tones or beeps using the buzzer 96 to indicate conditions such as time-out, barcode data memory full, power-on, good scan, bad scan, or the like.

The processor can be any microprocessor or microcontroller programmed and connected to perform the functions as described herein. The schematic shown in FIGS. 4a–b illustrates the use of a particular microprocessor, part no. MC68HC908GP32, available from Motorola, Inc. As will be discussed below in connection with FIGS. 5–6, the processor 86 is programmed and configured to interact with the various components shown in the circuit 80 in order to carry out the operations described by the flow charts of FIGS. 5–6.

The optical transceiver port 88 can be a commercially-available IR transceiver for transmitting and receiving IR signals according to the IrDA standard, such as part no. HRM1200L, available from Stanley Electronics, Inc. of Irvine, Calif.

In an alternative embodiment of the scanner 20, the optical transceiver port 88 is omitted and the IR LED 82 is instead used to transmitted decoded barcode data and the phototransistor 84 is used to receive ACK signals from a host during transmit mode operation. In this dual-use embodiment, the processor 86 is configured to modulate the IR LED 82 according to the IrDA standard and the barcode transmission format disclosed herein to effect transmission of the decoded barcode data to the host 40. The processor 86 is also configured to receive the ACK signals from the host 40 by way of the phototransistor 84.

The present invention is not limited to the circuit topology or components shown in FIGS. 4a–b. The functions of the circuit 80, including those of the processor 86, can be implemented using any suitable combination of hardware and software components, or one or more application specific circuits (ASICs), or any other custom or semi-custom device technologies for building electronic circuits that perform digital and/or analog processing.

Figure 5:
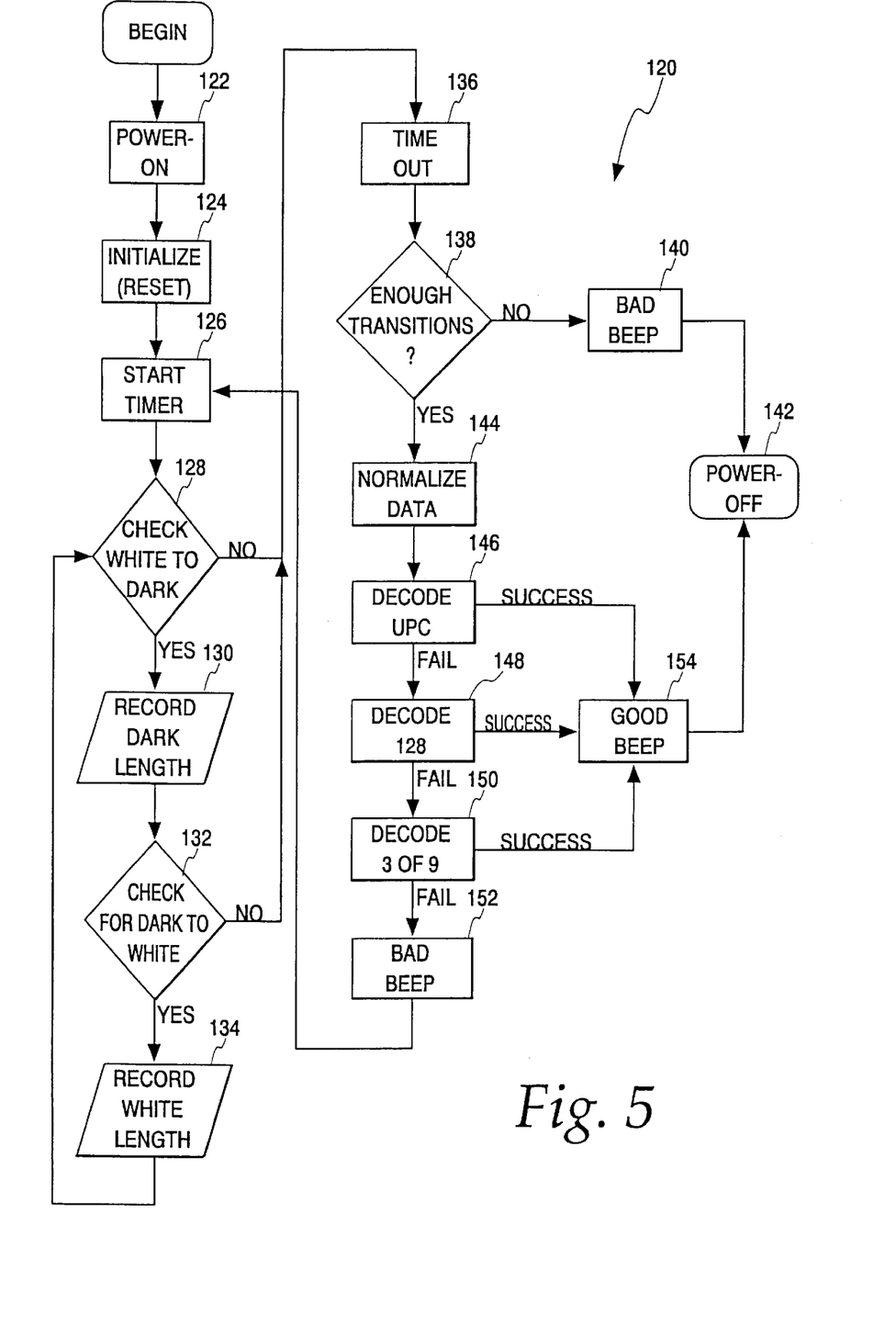
FIG. 5 is a flow chart diagram illustrating the scan operation of the optical scanner shown in FIGS. 1–3.

FIG. 5 illustrates a flow chart diagram 120 of the scanning operation of the scanner 20. In step 122, scanner 20 is powered-on into the scan mode by a user depressing the switch 90. This action provides the battery-supplied voltage the enable input (SHDN) of the voltage regulator 100 through a diode 104. The regulator 100 then powers up the processor 86. In addition to enabling the voltage regulator 100, the battery voltage is provided to a delay circuit 106, which provide a logic 'one' to an input of the processor 86. In response to this logic 'one', the processor 86 knows it is being powered up in the scan mode. In response, the processor 86 then outputs a logic 'one' signal to the diode 107 to maintain the voltage regulator 100 and in an enabled state. This results in the circuit 80 powering-up into a scan mode for reading barcode symbols.

In step 124, the processor 86 initializes the circuit and its internal registers. The processor 86 can be configured to scan, decode and store one barcode symbol per activation of the switch 90.

In step 126, the processor 86 starts an internal timer. The timer establishes a time-out period during which the scanner 20 can receive barcode data. It is during this time that a user can swipe the scanning head 26 over a barcode symbol to successfully read it. If not barcode transitions are detected during this time-out period, the processor 86 sends a logic 'zero' to the diode 107 and powers down the circuit 80. Preferably, the time-out period is five seconds.

Prior to the expiration of the time-out period, the processor activates the LED 82 for illuminating scanning surfaces. The processor 86 then waits to determine whether a white-to-dark transition is detected by the phototransistor 84 (step 128). If no white-to-dark transition is detected during the time-out period, a time out occurs (step 136). However, if a transition is detected, the processor records the time length of the dark period, which is the amount of time between a white-to-dark transition and a subsequent dark-to-white transition (step 130). In step 132, the processor waits for a dark-to-white transition. If this transition does not occur within the time-out period, a time-out event happens (step 136). If the dark-to-white transition is detected, the processor 86 records the length of the white space in time (step 134). The process then returns to step 128 to check for a subsequent white-to-dark transition.

After the scanner 20 is moved over a barcode symbol and after the transitions are recorded, the time-out event occurs (step 136). After the time-out, the processor 86 checks to determine whether a sufficient number of transitions occurred within the time-out period (step 138). Typically, a sufficient number of transitions are detected when the transition count during a time-out period exceeds a predetermined threshold value. If an insufficient number of transitions is detected, the processor 86 issues a bad beep using the buzzer 96 (step 140). A bad beep can be a predetermined noise having a lower frequency than a good beep.

If a sufficient number of transitions is detected, the processor 86 normalizes the bar length data (step 144). The bar length data indicates the amount of time occurring between each of the transitions and thus indicates the length of a dark bar or white space occurring in the barcode symbol. Industry standard barcode symbologies delimit bar and space widths in standard units that are multiples of each other. Accordingly, the transition times can be normalized by first finding the minimum transition time, and then dividing all other recorded transition times by the minimum time. The result is rounded to the closest whole number. The bar widths usually have one, two, or three units of width.

After normalizing the lengths, the processor 86 successively applies each of a plurality of industry standard decoding algorithms to the normalized barcode data until the data is successfully decoded, or all of the algorithms fail to properly decode the barcode data. The algorithms can be applied in any order. As illustrated in the method 120, the processor 86 first attempts to decode the series of transitions as UPC (universal product coded) data. For each of the algorithms, the processor 86 attempts to decode the transitions presuming a forward scan. If the data is not decoded presuming a forward scan, the processor 86 attempts the decoding algorithm presuming a backward scan of the barcode symbol.

Each of the industry standard algorithms encodes data in a mutually exclusive format, minimizing the probability that data encoded according to one format will be mistakenly decoded as data in another format.

If the data is successfully decoded according to the UPC algorithm (step 146), the processor 86 generates a good beep (step 154), and then powers down the circuit 80 by issuing a logic 'zero' to the diode 107 (step 142). After the circuit 80 is powered down, a user can depress the scan switch 90 to read another symbol.

However, if the processor 86 fails to decode the scanned data as UPC, it next attempts to decode the data according to the 128 algorithm (step 148). If the data is successfully decoded according to this algorithm, the processor 86 issues a good beep (step 154) and then powers down the circuit 80 (step 142). However, if the 128 algorithm also fails, the processor 86 then applies the 3 of 9 decoding algorithm. If this algorithm fails to properly decode the data, the processor 86 issues a bad beep (step 152) and begins a new time-out period by restarting the timer (step 126). However, if the 3 of 9 algorithm successfully decodes the data, the processor 86 issues a good beep (step 154) and powers down the circuit (step 142).

Although the method 120 illustrates three industry standard decoding algorithms, the processor 86 can be programmed to decode scanned data by attempting any number of barcode algorithms, standard or proprietary.

Prior to powering down the circuit 80, the processor 86 stores successfully decoded data in a memory buffer for future transmission to a host, such as the host computer 40. In the circuit 80 shown, the memory buffer is an internal EEPROM included in the processor 86. In this arrangement, the buffer can store up to 128 scanned barcodes.

Figure 6:
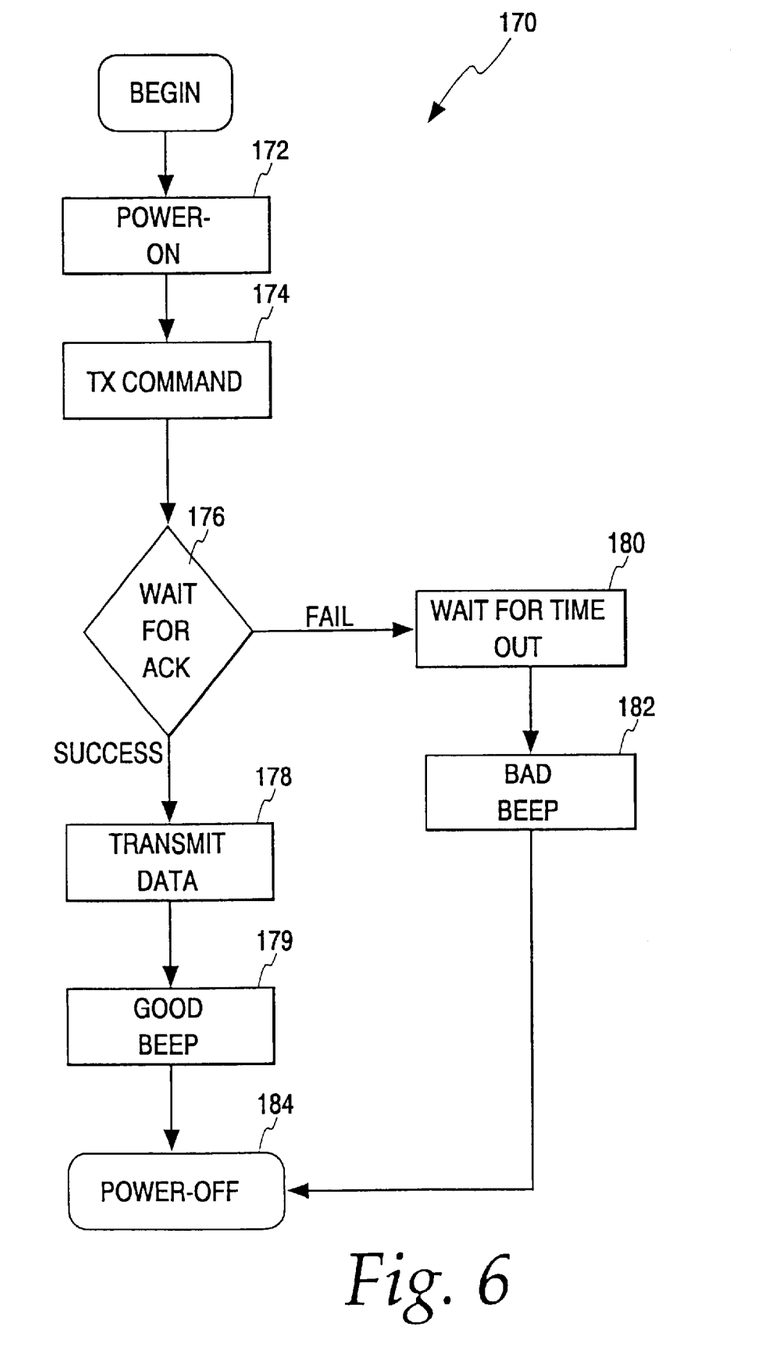
FIG. 6 is a flow chart diagram illustrating the transmit operation of the optical scanner shown in FIGS. 1–3.

FIG. 6 is a flow chart diagram illustrating a method 170 of transmitting the scanned barcode data to the host computer 40. The method 170 illustrates the transmit mode operation of the circuit 80.

In step 172, the circuit 80 is powered-on by depressing the transmit switch 92. The transmit switch 92 provides the battery voltage to the enable (SHDN) input of the voltage regulator 100. This causes the voltage regulator 100 to supply power to the processor 86. The processor 86 then powers-on and detects a logic 'zero' output by the delay circuit 106. A logic 'zero' indicates that the circuit 80 is powering-on in a transmit mode. The processor 86 then issues a logic 'one' to the diode 107 to hold the voltage regulator 100 in an enabled state for a predetermined time-out period.

In step 174, the processor 86 issues a transmit command to the host computer 40 by way of the optical transceiver port 88. The transmit command alerts the host 40 that the scanner 20 is going to transmit one or more packets of barcode data.

After transmitting the transmit command, the processor 86 waits for an acknowledgement (ACK) from the host. If an ACK is not received during the time-out period (step 180), the processor 86 issues a bad beep (step 182) and powers off the circuit 80 by issuing a logic 'zero' to the diode 107 (step 184).

However, if an ACK is received from the host 40 before expiration of the time-out period, the processor begins to transmit the decoded barcode data according to the barcode transmission format described above in connection with FIG. 2. The processor 86 can transmit each decoded barcode as a separate packet. Further, the processor 86 can sequentially transfer each of the decoded barcode stored in its memory until they are all transferred to the host 40. For each packet sent to the host 40, the scanner receives an ACK indicating whether the processor 86 is to delete the transmitted barcode from the internal memory of the scanner 20.

After successfully transferring the decoded barcode data, the processor 86 issues a good beep (step 179) and powers down the circuit 80 by issuing a logic 'zero' to the diode 107 (step 184).

Figure 7:
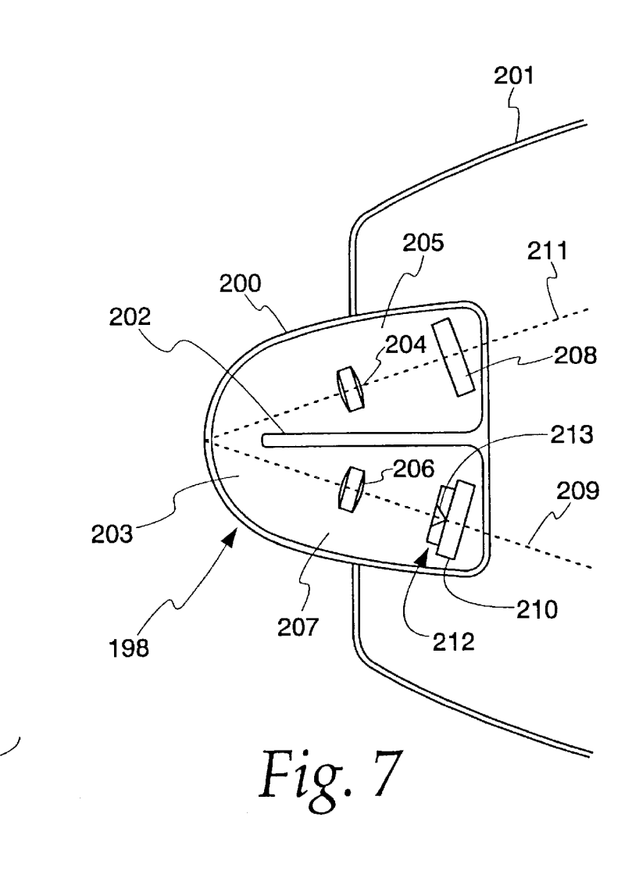
FIG. 7 is a partial top sectional view of the optical head included in the optical scanner of FIGS. 1–3.

FIG. 7 is a partial top sectional view of an optical head 198 that can be included in the optical scanner 20. The view shows the optical head 198 attached to the housing 201 of the scanner 20. The optical head 198 defines a compartment 203 that encloses an illuminator lens 204, an imaging lens 206, a photoemitter 208, a photodetector 210 with a pin hole aperture 212, and a dividing wall 202.

The wall 202 divides the compartment 203 into a first subcompartment 205 and a second subcompartment 207. As discussed above in connection with FIG. 3, the wall 202 reduces extraneous light reading the photodetector 210.

The optical scanning head 198 includes a cover 200 which is transparent to the frequency of light emitted by the photoemitter 208.

The photoemitter 208 is aligned with the optical axis 211 of the illuminator lens 204. The photodetector 210 and pin hole aperture 212 are likewise aligned with the axis 209 of the imaging lens 206.

The pinhole aperture 212 can be a metal or plastic plate placed in front of the photodetector 210 to cover all but a predefined area of the photosensitive area of the detector 210. The plate can be a separate drop-in unit, such as a flat square or rectangular-shaped piece of metal or plastic, for attaching to the housing 201, or alternatively, it can be integrally formed within the housing 201 to provide a screen for limiting the amount of light reaching the photodetector 210. A hole 213 formed in the plate, having a predefined diameter, permits light to reach the photosensitive surface of the detector 210.

The hole 213 formed in the pinhole aperture can be cylindrical or conical in shape. In a cylindrical configuration, the diameter of the hole can be a value between 0.1–2.0 mm. In the conical arrangement shown, the center of the hole can be aligned with the optical axis 209 of the imaging lens 206, with the wider end of the cone opening toward the imaging lens 206 and the smaller end of the cone opening toward the photosensitive area of the photodetector 210. Although the diameters of the openings can be any suitable value for improving the resolution, the wider opening of the hole 213 can be 1 mm, while the smaller opening can be 0.25 mm in diameter. The pinhole aperture 213 improves the image resolution of the optical system included in the scanning head.

Figure 8:
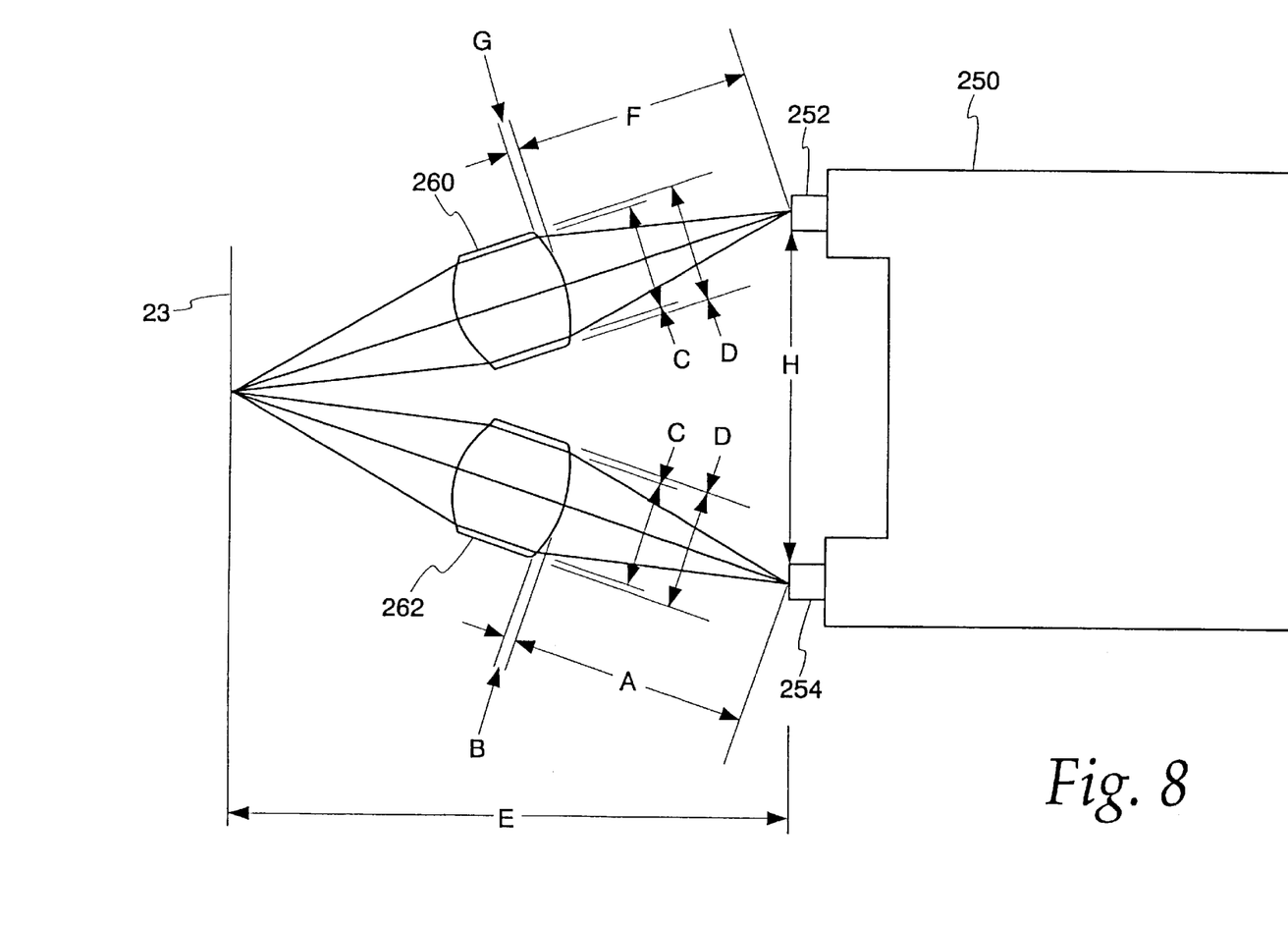
FIG. 8 is a light path sectional view of the optical scanner of FIGS. 1–3.

FIG. 8 is a light path sectional view of the optical scanner head. A circuit card 250 carries a photoemitter 252 and a photodetector 254. In the configuration shown, the photoemitter 252 and photodetector 254 are not aligned with the illuminator and imaging lenses 260, 262 optical axes. However, the arrangement of the optical elements 260, 262 and dimensions illustrated in FIG. 8 can be applied to either aligned or non-aligned photoemitter and photodetector devices.

The lenses 50, 54, 204, 206, 262 as described herein can have a magnification of one. The dimensions of the optical system shown in FIG. 8 are given in the table below.

| Parameter | Code | Value (mm) |
|---|---|---|
| Distance Phototransistor to first vertex of Imaging Lens | A | 4.202 |
| Sag to clear aperture (CA) of Imaging Lens | B | 0.1883 |
| Diameter of CA of Imaging Lens | C | 1.8 |
| OD of Imaging Lens | D | 2.2 |
| Distance from Phototransistor to Bar Code Surface | E | 10 |
| Distance LED to first vertex of Illuminator Lens | F | 4.202 |
| Sag to CA of Illuminator Lens | G | 0.1883 |
| Diameter of CA of Illuminator Lens | C | 1.8 |
| OD of Illuminator Lens | D | 2.2 |
| Distance from LED to Bar Code Plane | E | 10 |
| Distance between Photodetector and Photoemitter | H | 5.8 |

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed:

1. A hand-held contact barcode scanner for scanning barcodes, comprising:
   a photoemitter for shining an optical beam onto a scanning surface, whereby producing a reflected beam;
   a photodetector responsive to the reflected beam;
   a screen abutted against the photodetector, having an opening for limiting the amount of light reaching the photodetector;
   a lens placed in front of the screen for focusing reflected light onto the photodetector;
   a memory for storing data related to one or more transitions detected in the reflected beam;
   an infrared (IR) transceiver for transmitting the stored data over an IR link to a host;
   a processor, operatively coupled to the photodetector, the photoemitter, the memory, and the IR transceiver, configured to permit the scanner to read a barcode when the scanner is moved over the barcode at a lineal speed in the range of one inch/second to five inches/second;
   a first manually-operated switch, operatively coupled to the processor, for selectively activating the photoemitter in order to read the barcode; and
   a second manually-operated switch, operatively connected to the processor, for selectively causing the data stored in the memory to be transmitted by the IR transceiver.

2. The scanner of claim 1, wherein the processor normalizes bar length data.

3. The scanner of claim 1, wherein the processor actives the photoemitter for a predetermined amount of time in response to the first manually-operated switch.

4. The scanner of claim 1, further comprising:
   a light, operatively couple to the processor, for visually indicating a successful scan of a barcode.

5. The scanner of claim 1, wherein the memory is capable of storing data for a plurality of scanned barcodes.

6. The scanner of claim 1, further comprising:
   an illuminating lens for focusing the optical beam output from the photoemitter.

7. A system, comprising:
   a host including:
      an infrared (IR) port,
      a database storing information related to one or more barcodes,
      application software for communicating between the database and the IR port; and
      a contact barcode scanner for scanning barcodes, including:
         a photoemitter for shining light onto a scanning surface, whereby producing reflected light,
         a photodetector responsive to the reflected light,
         a screen abutted against the photodetector, having an opening for limiting the amount of light reaching the photodetector,
         a lens placed in front of the screen for focusing reflected light onto the photodetector,
         a memory for storing data related to one or more transitions detected in the reflected light,
         an infrared (IR) transceiver for transmitting the stored data to the IR port of the host,
         a processor, operatively coupled to the photodetector, the photoemitter, the memory, and the IR transceiver, configured to permit the scanner to read a barcode when the scanner is moved over the barcode at a lineal speed in the range of one inch/second to five inches/second,
         a first switch, operatively coupled to the processor, for selectively activating the photoemitter in order to read the barcode, and
         a second switch, operatively connected to the processor, for selectively causing the data stored in the memory to be transmitted by the IR transceiver.

8. The system of claim 7, wherein the processor normalizes bar length data.

9. The system of claim 7, wherein the processor actives the photoemitter for a predetermined amount of time in response to the first switch.

10. The system of claim 7, further comprising:
    a light, operatively couple to the processor, for visually indicating a successful scan of a barcode.

11. The system of claim 7, wherein the memory is capable of storing data for a plurality of scanned barcodes.

12. The system of claim 7, further comprising:
    an illuminating lens for focusing the light output from the photoemitter.

13. A hand-held contact barcode scanner for scanning barcodes, comprising:
    means for shining an optical beam onto a scanning surface, whereby producing a reflected beam;
    means for receiving the reflected beam;
    means for restricting the amount of light reaching the receiving means, the restricting means abutted against the receiving means;
    means for focusing the reflected beam onto the receiving means placed in front of the restricting means;
    means for storing data related to one or more transitions detected in the reflected beam;
    means for transmitting the stored data over an infrared link to a host;
    means for permitting the scanner to read a barcode when the scanner is moved over the barcode at a lineal speed in the range of one inch/second to five inches/second;
    means for manually activating the scanner to read the barcode; and
    means for selectively causing the data stored in the storing means to be transmit ted by the transmitting means.

14. The scanner of claim 13, further comprising:
    means for normalizing bar length data derived from the reflected beam.

15. The scanner of claim 13, further comprising:
    means for activating the shining means for a predetermined amount of time.

16. The scanner of claim 13, further comprising:
    means for visually indicating a successful scan of a barcode.

17. The scanner of claim 13, wherein the storing means includes means for storing data for a plurality of scanned barcodes.

18. The scanner of claim 13, further comprising:
    means for focusing the optical be am output from the shining means.

19. A method for using a barcode scanner to scan a barcode located on a scanning surface, comprising:
    manually activating a switch causing a photoemitter to shine a light onto the scanning surface, whereby producing a reflected beam;
    moving the scanner over the barcode at a lineal speed in the range of one inch/second to five inches/second;

restricting the amount of light from the reflected beam reaching a photodetector using a screen abutted against the photodetector, having an opening for limiting the amount of light reaching the photodetector;

focusing the reflected beam onto the photodetector using a lens placed in front of the screen;

receiving the restricted reflected beam at the photodetector;

detecting one or more transitions in the reflected beam;

storing data related to the transitions; and transmitting the stored data over an infrared link to a host.

20. The method of claim 19, further comprising:

normalizing bar length data derived from the reflected beam.

21. The method of claim 19, further comprising:

activating the photoemitter for a predetermined amount of time.

22. The method of claim 19, further comprising:

illuminating a light included in the scanner indicating a successful scan of the barcode.

23. The method of claim 19, further comprising:

storing data for a plurality of scanned barcodes.

24. The method of claim 19, further comprising:

focusing the light output from the photoemitter.

\* \* \* \* \*